US011803004B1

(12) United States Patent
Ji et al.

(10) Patent No.: US 11,803,004 B1
(45) Date of Patent: Oct. 31, 2023

(54) DISPLAY DEVICE AND BACKLIGHT MODULE (71) Applicant: HKC CORPORATION LIMITED, Shenzhen (CN)

(72) Inventors: Guofei Ji, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/087,835

(22) Filed: Dec. 23, 2022

(30) Foreign Application Priority Data

Jun. 27, 2022 (CN) .......................... 202210738328.8

(51) Int. Cl.
F21V 8/00 (2006.01)
G02F 1/1335 (2006.01)
G06F 1/16 (2006.01)
G02F 1/1333 (2006.01)

(52) U.S. Cl.
CPC .......... *G02B 6/0031* (2013.01); *G02B 6/009* (2013.01); *G02B 6/0068* (2013.01); *G02B 6/0088* (2013.01); *G02F 1/133305* (2013.01); *G02F 1/133614* (2021.01); *G06F 1/1652* (2013.01)

(58) Field of Classification Search
CPC .. G02B 6/0031; G02B 6/0055; G02B 6/0088; G02B 6/009; G02F 1/133305; G06F 1/1652
See application file for complete search history.

(56) References Cited

U.S. PATENT DOCUMENTS

| | | | |
|---|---|---|---|
| 2017/0045677 A1* | 2/2017 | Zhou | .................... G02B 6/0088 |
| 2022/0155637 A1* | 5/2022 | Du | .................... G02F 1/133603 |
| 2022/0187528 A1* | 6/2022 | Zhou | .................... G02B 6/0055 |

* cited by examiner

*Primary Examiner* — Keith G. Delahoussaye (57) ABSTRACT

A display device and a backlight module are disclosed. The display device includes a backlight module and a liquid crystal display panel that are correspondingly arranged. The liquid crystal display panel includes a flat portion and at least one bent portion. One end of the bent portion is connected to an edge of the flat portion, and the other end is bent downward. The backlight module includes a light guide plate, an optical film, and a light supplementation structure. The optical film is arranged between the light guide plate and the liquid crystal display panel, and covers the light guide plate and the light supplementation structure. The light guide plate is disposed corresponding to the flat portion. The light supplementation structure is arranged between the light guide plate and the bent portion, and supplements light for the bent portion.

20 Claims, 4 Drawing Sheets

DISPLAY DEVICE AND BACKLIGHT MODULE

CROSS-REFERENCE TO RELATED APPLICATIONS

This application claims the priority and benefit of Chinese patent application 2022107383288, titled "Display Device and Backlight Module" and filed Jun. 27, 2022, with China National Intellectual Property Administration, the entire contents of which are incorporated herein by reference.

TECHNICAL FIELD

The present application relates to the field of display technology, and in particular, to a display device and a backlight module.

BACKGROUND

The description provided in this section is intended for the mere purpose of providing background information related to the present application but doesn't necessarily constitute prior art.

With the development of technology, users' requirements for screen-to-body ratio are getting higher and higher. Even a narrow-bezel LCD panel however still has a border around the edges of the LCD panel, which cannot meet the user's demands for full-screen.

In order to achieve the ultimate full-screen LCD panel, one method is to bend the edges of the LCD panel downward to form a waterfall screen, so as to achieve the ultimate full-screen effect of the LCD panel. The existing curved or full screen is OLED bead, which has problems of high cost, poor yield and low lifespan. Although the LCD has been developing towards narrow bezels and full screen in recent years, it has never achieved a true full screen. In addition, the LCD screen has a problem that the region where the edges of the LCD panel are bent downward is too dark, so that it cannot display normally.

SUMMARY

In view of the above, it is a purpose of the present application to provide a display device and a backlight module, which solve the problem that the region where the edge of the liquid crystal display panel is bent downwards is too dark and cannot display normally, thus realizing the full-screen visual effect of the display device.

The present application discloses a display device, including a backlight module and a liquid crystal display panel that are correspondingly arranged. The liquid crystal display panel includes a flat portion and at least one bent portion. One end of the bent portion is connected with an edge of the flat portion, and the other end is bent downward. The backlight module includes a light guide plate, an optical film and a light supplementation structure. The optical film is disposed between the light guide plate and the liquid crystal display panel, and covers the light guide plate and the light supplementation structure. The light guide plate is disposed corresponding to the flat portion. The light supplementation structure is arranged between the light guide plate and the bent portion, and supplements light for the bent portion.

Optionally, the light supplementation structure includes a lamp bead. The lamp bead includes a reflector cup holder, a first chip and a second chip. The first chip and the second chip are arranged on the reflector cup holder. The first chip faces the bent portion, and supplements light on the bent portion. The second chip faces the flat portion corresponding to the lamp bead, and supplements light on the flat portion corresponding to the lamp bead.

Optionally, the light supplementation structure includes a lamp bead. The lamp bead includes a reflector cup holder and a third chip. The reflector cup holder has a slop. The slop faces the junction of the bent portion and the flat portion. The third chip is arranged on the slop of the reflection cup holder. The third chip supplements light on the junction of the bent portion and the flat portion, the bent portion, and the flat portion.

Optionally, the display device further includes a main light source, the light emitting surface of the main light source faces the light guide plate, and the light guide plate provides backlight for the flat portion.

Optionally, the light supplementation structure includes lamp beads. The lamp bead includes a reflector cup holder, a fourth chip, a fifth chip and a sixth chip. The fourth chip, the fifth chip and the sixth chip are all arranged on the reflector cup holder. The fourth chip faces the bent portion and supplements light for the bent portion. The fifth chip faces the flat portion, and supplements light on the flat portion corresponding to the lamp bead. The sixth chip is the main light source. The sixth chip faces the light guide plate, and provides backlight for the flat portion corresponding to the light guide plate through the light guide plate.

Optionally, the light emission brightness of the fourth chip is lower than that of the sixth chip, and the light emission brightness of the fifth chip is lower than that of the sixth chip.

Optionally, the light supplementation structure includes lamp beads. The lamp bead includes a reflector cup holder, a seventh chip and an eighth chip. The reflector cup holder has a first slop and a second slop. The first slop faces the junction of the bent portion and the flat portion. The second slope faces the light guide plate. The seventh chip is arranged on the first slope, and the eighth chip is arranged on the second slope. The side of the light guide plate corresponding to the lamp bead is the light incident surface. The light incident surface is inclined, and the slope of the light incident surface is equal to that of the second slop. The second slop faces the light incident surface of the light guide plate.

Optionally, bent portions are arranged around the flat portion at four sides, and the lamp beads are arranged around the light guide plate at four sides.

Optionally, the optical film includes a main body part and a curved part. The curved part is disposed at the edge of the main body part. The main body part corresponds to the flat portion of the liquid crystal display panel. The curved part corresponds to the bent portion of the liquid crystal display panel.

The present application further discloses a backlight module, which is the backlight module in the above-mentioned display device, and provides backlight for the liquid crystal display panel.

The backlight module is used in the above-mentioned display device to provide backlight for the liquid crystal display panel.

Compared with the solution of realizing a full screen by bending the edge of an OLED bead screen (organic electro-optical laser display screen), the present application aims at bending the edge of an LCD screen (liquid crystal display screen), and a light supplementation structure is arranged between the light guide plate and the bent portion, thus supplementing light on the bent portion, solving the problem that the region where the edge of the liquid crystal display panel is bent downwards is too dark and cannot display normally, thereby realizing the full-screen visual effect of the display device.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

Figure 1:
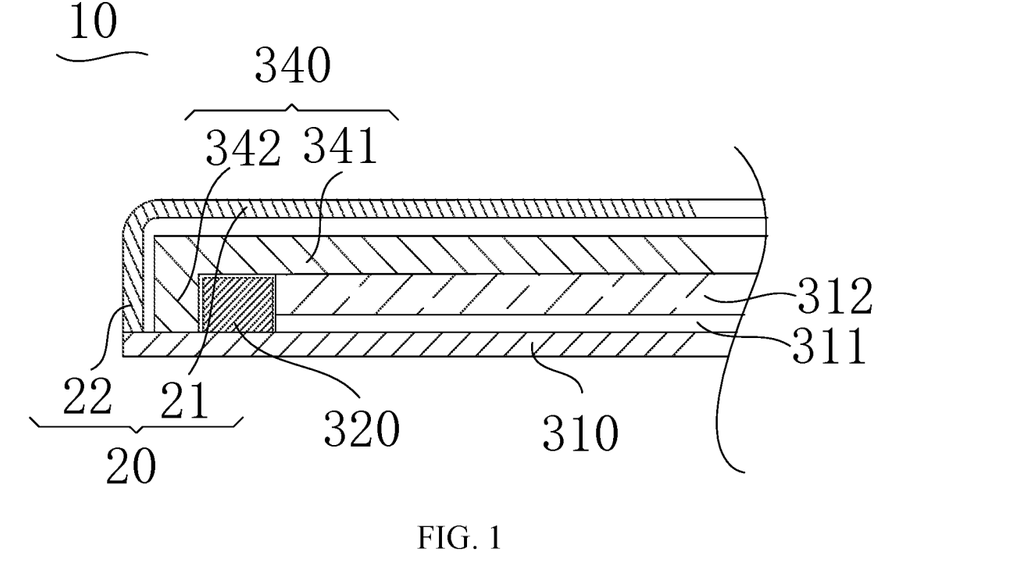
FIG. 1 is a schematic diagram of a part of a display device according to an embodiment of the present application.

FIG. 1 is a schematic diagram of a part of a display device according to an embodiment of the present application. As shown in FIG. 1, the present application discloses a display device 10. The display device 10 includes a backlight module 30 and a liquid crystal display panel 20 that are correspondingly arranged. The liquid crystal display panel 20 includes a flat portion 21 and at least one bent portion 22. One end of the bent portion 22 is connected to the edge of the flat portion 21, and the other end is bent downward. The backlight module 30 includes a light guide plate 312, an optical film 340 and a light supplementation structure 320. The optical film 340 is disposed between the light guide plate 312 and the liquid crystal display panel 20 and covers the light guide plate 312 and the light supplementation structure 320. The light guide plate 312 is disposed corresponding to the flat portion 21. The light supplementation structure 320 is disposed between the light guide plate 312 and the bent portion 22, and supplements light for the bent portion 22.

Further, a ninety-degree angle is formed between the bent portion 22 and the flat portion 21, thereby forming a waterfall screen. Compared with a general curved screen, the bent portion 22 of the liquid crystal display panel 20 of the present application is bent to a greater extent, so that a waterfall screen can be realized. In addition, the bezel of the liquid crystal display panel 20 cannot be seen from the user's viewing angle, thereby achieving the ultimate full-screen effect.

The display screen of the waterfall screen type may be made of OLED bead type display screen, but due to the high cost of OLED bead, the waterfall screen has not been well promoted. With the development of UTG (ultra-thin flexible glass) technology, UTG is used to replace the glass substrate in the liquid crystal display panel 20, so that the LCD screen can also realize the edge bending of the liquid crystal display panel 20. That is, the bent portion 22 and the flat portion 21 are bent at an included angle of ninety degrees, or even a larger degree.

Since the cost of LCD screen is much lower than that of OLED bead screen, the waterfall screen of LCD technology can be better promoted. However, since the LCD screen cannot emit light by itself, the bent portion 22 of the display device 10 suffers from serious lack of light when displaying an image, and so cannot display normally.

However, in the present application, a light supplementation structure 320 is disposed between the light guide plate 312 and the bent portion 22 to supplement the bent portion 22 with light, thereby realizing the effect of a full screen.

The light supplementation structure 320 may be a light bar, a lamp bead 321 or a structure in which the lamp bead 321 actively emits light, or may be a light guide structure such as a reflective sheet 311 or a light guide plate 312.

The solutions of the present application are explained below with reference to specific two embodiments.

Embodiment 1

Figure 2:
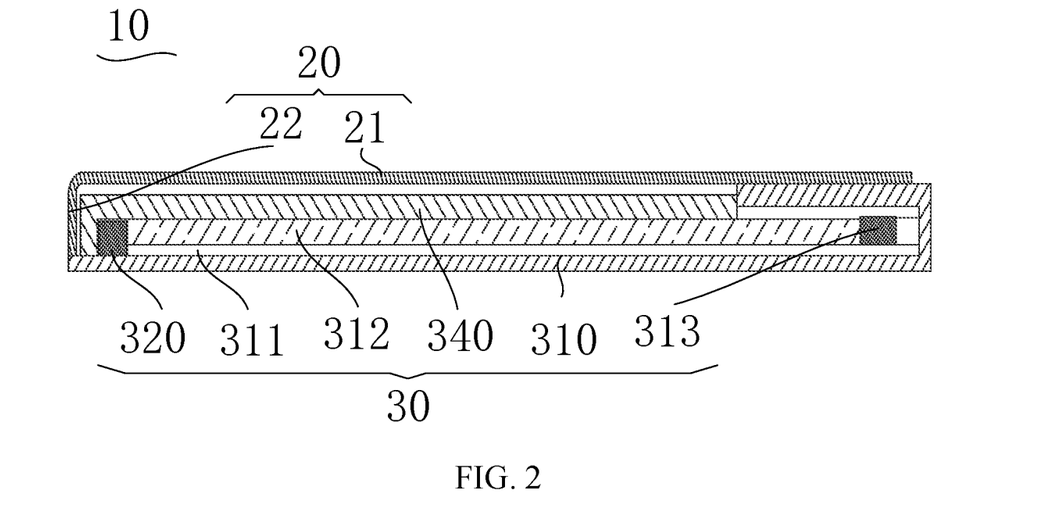
FIG. 2 is a schematic diagram of a display device according to a first embodiment of the present application.

FIG. 2 is a schematic diagram of a display device according to a first embodiment of the present application. As shown in FIG. 2, the present application discloses a backlight module 30. The backlight module 30 includes a back plate 310, a reflective sheet 311, a light guide plate 312 and an optical film 340 that are stacked in sequence. The edge of the liquid crystal display panel 20 is bent toward the back plate 310 and connected to the back plate 310. The backlight module 30 provides backlight for the liquid crystal display panel 20.

Specifically, the optical film 340 includes a main body part 341 and a curved part 342. The curved part 342 is disposed on the edge of the main body part 341. The main body part 341 corresponds to the flat portion 21 of the liquid crystal display panel 20. The curved part 342 corresponds to the bent portion 22 of the liquid crystal display panel 20.

The bent portion 22 of the liquid crystal display panel 20 can be arranged only on one side of the liquid crystal display panel 20, and can also be arranged around the liquid crystal display panel 20 at four sides at the same time. In this embodiment, the liquid crystal display panel 20 is provided with the bent portions 22 corresponding to the upper border and the left and right frames of the display device 10 as an example.

The display device 10 further includes a main light source 313. The light-emitting surface of the main light source 313 faces the light guide plate 312. The flat portion 21 is provided with a backlight through the light guide plate 312, that is, the backlight of this embodiment is an edge-type backlight.

Figure 3:
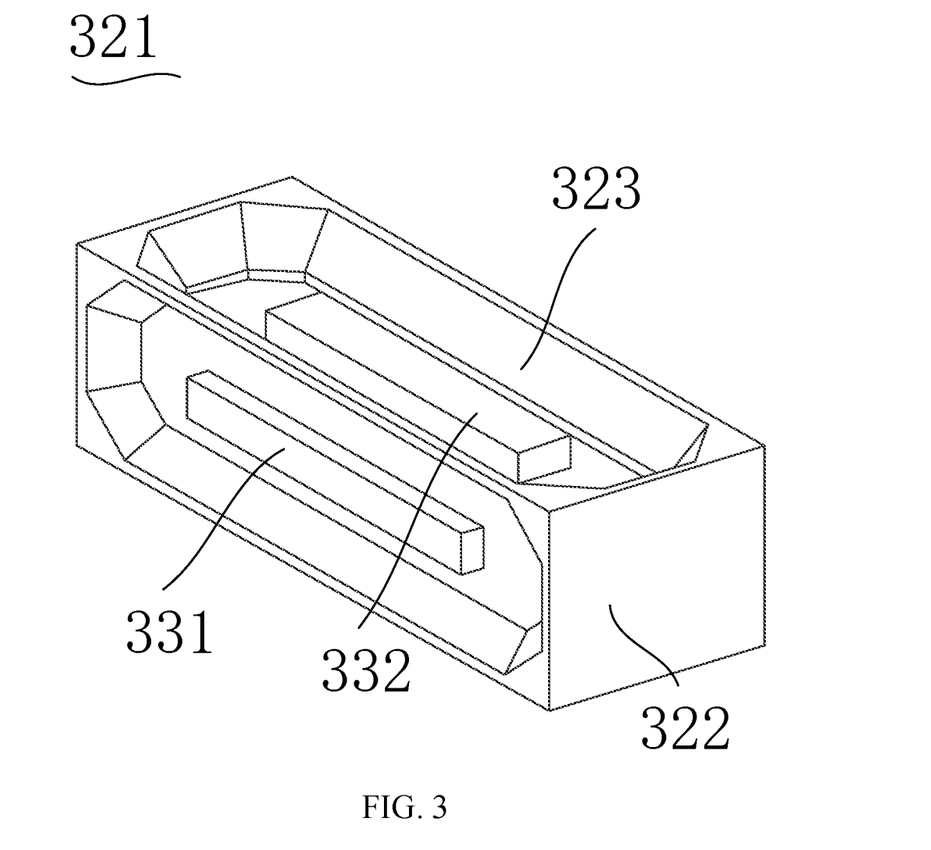
FIG. 3 is a schematic diagram of a first type of light supplementation structure according to the first embodiment of the present application.

FIG. 3 is a schematic diagram of a first light supplementation structure according to the first embodiment of the present application. As shown in FIG. 3, the light supplementation structure 320 is a lamp bead 321. The lamp bead 321 includes a reflector cup holder 322, a first chip 331 and a second chip 332. The first chip 331 and the second chip 332 are arranged on the reflector cup holder 322. The first chip 331 faces the bent portion 22 and supplements light for the bent portion 22. The second chip 332 faces the flat portion 21 corresponding to the lamp bead 321, and supplements light on the flat portion 21 corresponding to the lamp bead 321.

By arranging two chips on one reflector cup holder 322, it is equivalent to an lamp bead lamp bead 321 that can emit light from both sides at the same time.

Specifically, the reflector cup holder 322 is a rectangular parallelepiped structure. The first chip 331 is disposed on the left side of the reflector cup holder 322, namely on the side facing the bent portion 22. The second chip 332 is disposed on the upper side of the reflector cup holder 322, namely the side facing the flat portion 21 corresponding to the lamp bead 321, and can supplement light on the flat portion 21 corresponding to the lamp bead 321. Compared with other light supplementation structures 320 provided in two different orientations, the structure of the light supplementation structure 320 in this embodiment is simpler.

Further, the positions of the reflection cup holder 322 corresponding to the first chip 331 and the second chip 332 are each recessed toward the interior of the reflection cup holder 322 to form a reflective groove 323. The first chip 331 and the second chip 332 are respectively arranged in two different reflective grooves 323, and a fluorescent glue is injected into the groove walls of the reflective grooves 323, and the fluorescent glue can perform secondary reflection on the light emitted by the chip. In addition, the groove wall of the reflective groove 323 is inclined, and the area of the opening of the reflective groove 323 is larger than the area of the groove bottom, so that the light emitted by the first chip 331 and the second chip 332 is reflected and diverged again, and the emission area of the lamp bead 321 is further enlarged.

Figure 4:
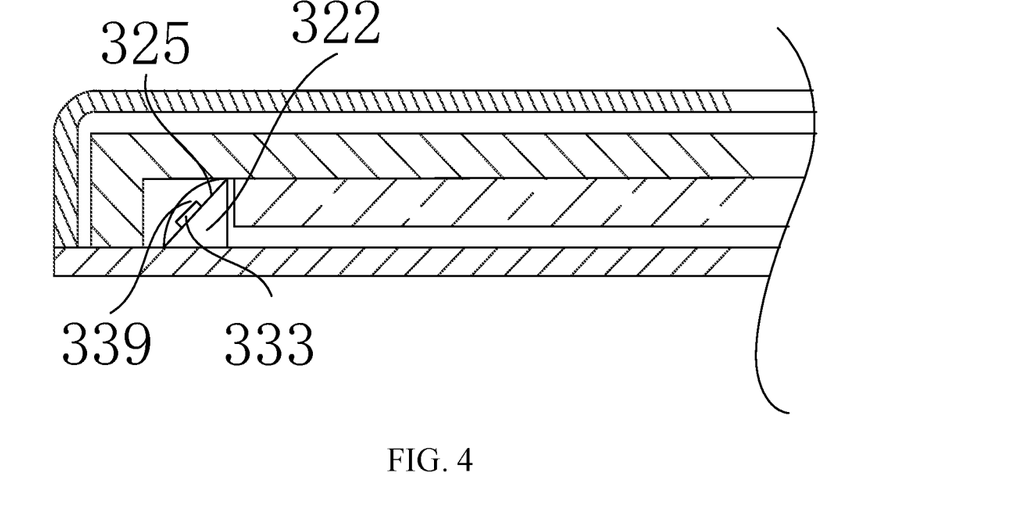
FIG. 4 is a schematic diagram of a second type of light supplementation structure according to the first embodiment of the present application.

Of course, this embodiment can also adopt another structure of the lamp bead 321, that is, a lamp bead 321 with only one chip.

As shown in FIG. 4, the lamp bead 321 includes a reflector cup holder 322 and a third chip 333. The reflector cup holder 322 has a slop 325, and the slop 325 faces the junction of the bent portion 22 and the flat portion 21. The third chip 333 is disposed on the slop 325 of the reflection cup holder 322. The third chip 333 supplements light on the boundary between the bent portion 22 and the flat portion 21, the bent portion 22, and the flat portion 21.

Specifically, the reflector cup holder 322 may be a triangular prism structure, and the cross section is a right-angled triangle, and the slop 325 faces the junction of the bent portion 22 and the flat portion 21, so that the junction of the bent portion 22 and the flat portion 21, the bent portion 22, and the flat portion 21 can be supplemented with light at the same time, and there is no need to arrange two chips on the reflector cup holder, and the structure is simpler. In addition, the brightness of the light at the three locations, including the junction of the bent portion 22 and the flat portion 21, the bent portion 22, and the flat portion 21 is more uniform.

Further, a lens 339 can also be arranged on the lamp bead 321, and the lens 339 is arranged on the chip of the lamp bead 321 to diffuse the light emitted by the chip, so as to further increase the diffusion area of the light emitted by the chip.

Embodiment 2

Figure 5:
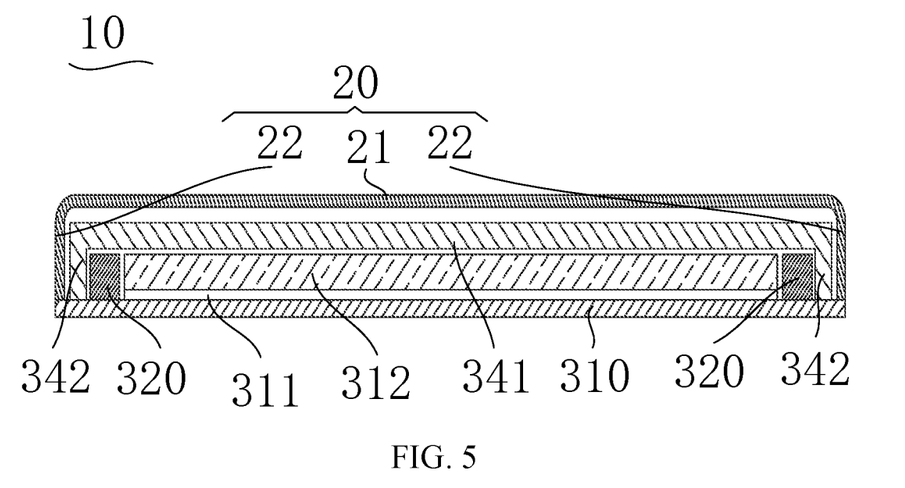
FIG. 5 is a schematic diagram of a display device according to a second embodiment of the present application.
Figure 6:
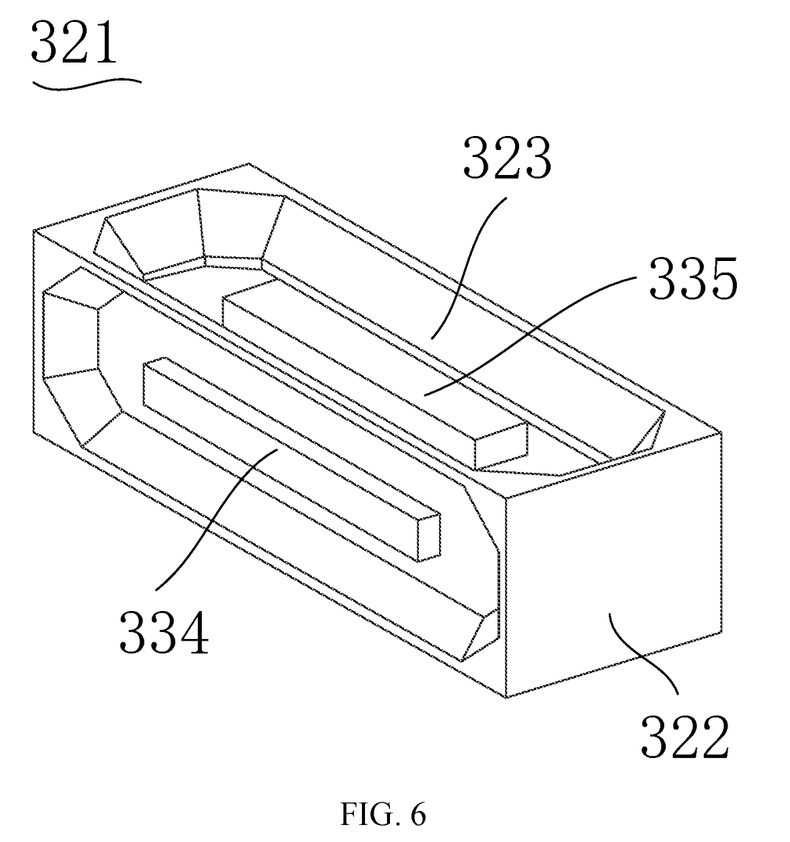
FIG. 6 is a schematic diagram of a first type of lamp bead according to the second embodiment of the present application.
Figure 7:
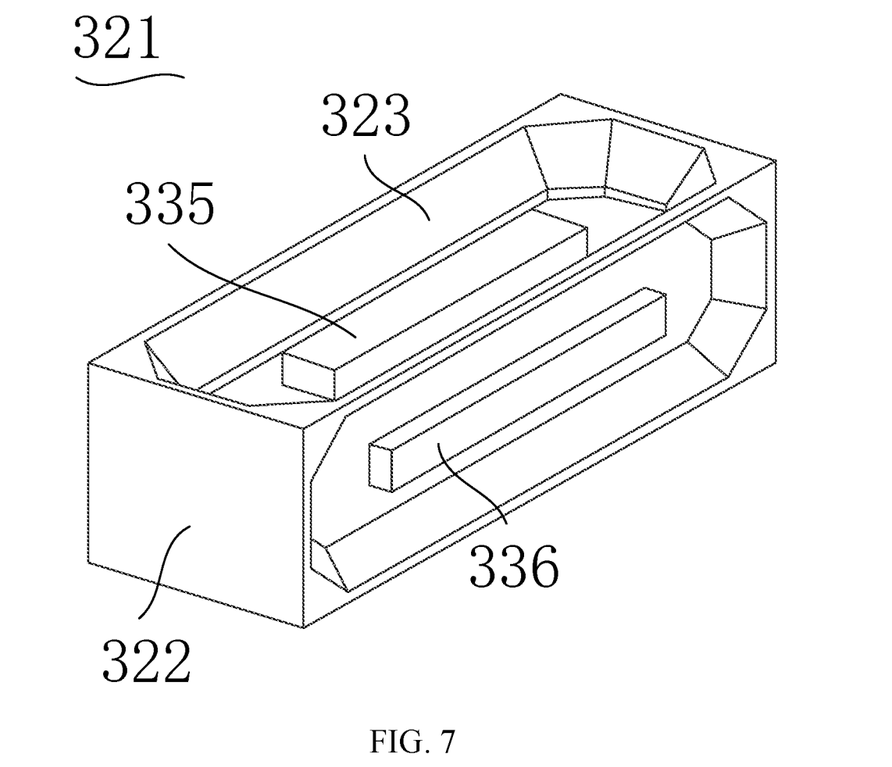
FIG. 7 is a schematic diagram of another viewing angle of the first type of lamp bead according to the second embodiment of the present application.

FIG. 5 is a schematic diagram of a display device according to a second embodiment of the present application. FIG. 6 is a schematic diagram of a first type of lamp bead according to the second embodiment of the present application. FIG. 7 is a schematic diagram of another viewing angle of the first type of lamp bead according to the second embodiment of the present application. As shown in FIGS. 5-7, different from the first embodiment, the lamp bead 321 of this embodiment includes three chips.

This embodiment is equivalent to combining the light supplementation structure 320 and the main light source 313 together, so that the bent portions 22 can be simultaneously arranged around the corresponding liquid crystal display panel 20 of the display device 10 at four sides. Compared with the existing design in which the bent portions 22 are only provided on both sides of the corresponding liquid crystal display panel 20 of the display device 10, the solution of this embodiment can totally enable the display device 10 to achieve a full-screen visual effect.

In this embodiment, the flat portion 21 is provided with the bent portion 22 on all four sides, and the light guide plate 312 is provided with the lamp beads 321 on all four sides as an example. Compared with the solution of the first embodiment, in this embodiment, since the light guide plate 312 is provided with lamp beads 321 all around, which emit light toward the light guide plate 312 at the same time, the brightness of the light refracted by the light guide plate 312 is more uniform, and the display effect of the liquid crystal display panel 20 is also more uniform. Of course, it can also be designed depending on specific needs, and the number of lamp beads 321 on the same side of the light guide plate 312 can also be designed depending on specific needs. In addition, the lamp beads 321 on the same side of the light guide plate 312 can be connected in series for synchronous control, or all the lamp beads 321 on the four sides of the light guide plate 312 can be connected in series for synchronous control, which is not limited here.

Specifically, the lamp bead 321 includes a reflector cup holder 322, a fourth chip 334, a fifth chip 335 and a sixth chip 336. The fourth chip 334, the fifth chip 335 and the sixth chip 336 are all disposed on the reflector cup holder 322. The fourth chip 334 faces the bent portion 22 and supplements the bent portion 22 with light. The fifth chip 335 faces the flat portion 21 and supplements light on the flat portion 21 corresponding to the lamp bead 321. The sixth chip 336 is the main light source 313. The sixth chip 336 faces the light guide plate 312, and provides backlight for the flat portion 21 corresponding to the light guide plate 312 through the light guide plate 312.

Further, since the light emitted by the sixth chip 336 is transmitted through the light guide plate 312 to the flat portion 21 corresponding to the light guide plate 312, the light-emitting brightness of the fourth chip 334 is designed to be lower than that of the sixth chip 336, and the light-emitting brightness of the fifth chip 335 is also designed lower than that of the sixth chip 336. This can be achieved by setting the areas of the fourth chip 334 and the fifth chip 335 to be smaller than the area of the sixth chip 336, so that the light-emitting area of each of the fourth chip 334 and the fifth chip 335 is smaller than that of the sixth chip 336. Thus, when the display device 10 displays, the brightness between the bent portion 22 and the flat portion of the corresponding liquid crystal display panel 20 is more consistent, so that the display of the entire liquid crystal display panel is more uniform.

Figure 8:
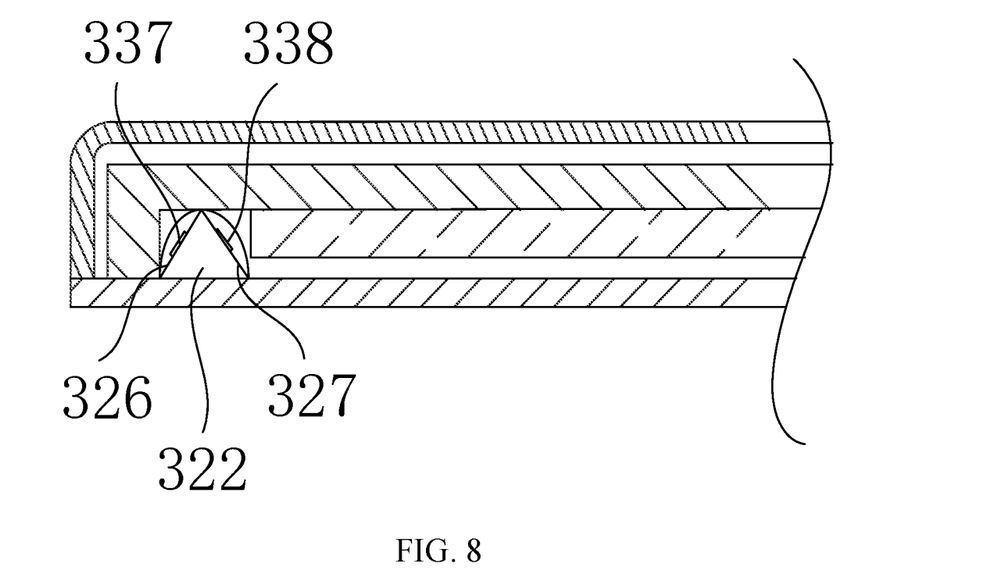
FIG. 8 is a schematic diagram of a second type of light supplementation structure according to the second embodiment of the present application.

Of course, this embodiment can also adopt another structure of the lamp bead 321, which is a lamp bead 321 with only two chips.

As shown in FIG. 8, the lamp bead 321 includes a reflector cup holder 322, a seventh chip 337 and an eighth chip 338. The reflector cup holder 322 has a first slop 326 and a second slop 327. The first slop 326 faces the junction of the bent portion 22 and the flat portion 21. The second slope 327 faces the light guide plate 312. The seventh chip 337 is disposed on the first slop 326. The eighth chip 338 is disposed on the second slop 327. The side of the light guide plate 312 corresponding to the lamp bead 321 is the light incident side. The light incident surface is inclined, and the slope of the light incident surface is equal to that of the second slop 327. The second slop 327 faces the light incident surface of the light guide plate 312.

That is, the cross section of the reflector cup holder 322 is an isosceles triangle. The seventh chip 337 supplements light at the junction of the bent portion 22 and the flat portion 21, the bent portion 22, and the flat portion 21. The eighth chip 338 performs light supplementation for the flat portion 21 and the light guide plate 312. Compared with the solution of disposing three chips, the structure of this solution is simpler.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The technical solutions of the present application can be widely used in various liquid crystal display panels, such as TN (Twisted Nematic) display panels, IPS (In-Plane Switching) liquid crystal display panels, VA (Vertical Alignment) liquid crystal display panels, and MVA (Multi-Domain Vertical Alignment) liquid crystal display panels, which are all applicable to the above solutions.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display device, comprising a backlight module and a liquid crystal display panel that are correspondingly arranged;
   wherein the liquid crystal display panel comprises a flat portion and at least one bent portion;
   wherein one end of the at least one bent portion is connected to an edge of the flat portion, and the other end of the at least one bent portion is bent downward;
   wherein the backlight module comprises a light guide plate, an optical film, and a light supplementation structure; wherein the optical film is disposed between the light guide plate and the liquid crystal display panel and covers the light guide plate and the light supplementation structure;
   wherein the light guide plate is arranged corresponding to the flat portion; and
   wherein the light supplementation structure is disposed between the light guide plate and the bent portion and is configured to supplement light for the bent portion.

2. The display device of claim 1, wherein the light supplementation structure comprises a lamp bead, the lamp bead comprising a reflector cup holder, a first chip, and a second chip; wherein the first chip and the second chip are arranged on the reflector cup holder;
   wherein the first chip is disposed to face the bent portion, and is configured to supplement light for the bent portion;
   wherein the second chip is disposed to face the flat portion corresponding to the lamp bead, and is configured to supplement light for a part of the flat portion opposite the lamp bead.

3. The display device of claim 2, wherein positions of the reflection cup holder corresponding to the first chip and the second chip are each recessed toward an interior of the reflection cup holder to form a reflective groove, and wherein the first chip and the second chip are respectively arranged in two different reflective grooves.

4. The display device of claim 3, wherein a fluorescent glue is disposed on a groove wall of the reflective groove.

5. The display device of claim 4, wherein the groove wall of the reflective groove is inclined and an area of the notch of the reflective groove is larger than an area of the groove bottom.

6. The display device of claim 1, wherein the light supplementation structure comprises a lamp bead, the lamp bead comprising a reflector cup holder and a third chip;
   wherein the reflector cup holder comprises a slop, which faces a junction of the bent portion and the flat portion;
   wherein the third chip is arranged on the slop of the reflector cup holder, and is configured to supplement light to the junction of the bent portion and the flat portion, to the bent portion, and to the flat portion.

7. The display device of claim 6, wherein a shape of the reflector cup holder is a triangular prism, and a cross section of the reflector cup holder is a right triangle.

8. The display device of claim 6, wherein the light supplementation structure further comprises a lens, which is disposed on the third chip.

9. The display device of claim 1, further comprising a main light source, wherein the main light source comprises a light-emitting surface facing the light guide plate, and is configured to provide a backlight for the flat portion through the light guide plate.

10. The display device of claim 9, wherein the light supplementation structure comprises a lamp bead, the lamp bead comprising a reflector cup holder, a fourth chip, a fifth chip, and a sixth chip; wherein the fourth chip, the fifth chip, and the sixth chip are all arranged on the reflector cup holder;
   wherein the fourth chip is disposed to face the bent portion, and is configured to supplement light to the bent portion;
   wherein the fifth chip is disposed to face the flat portion, and is configured to supplement light to a part of the flat portion opposite the lamp bead;
   wherein the sixth chip is the main light source, and is disposed to face the light guide plate and configured to provide the backlight for the flat portion corresponding to the light guide plate.

11. The display device of claim 10, wherein a light emission brightness of the fourth chip is lower than that of the sixth chip, and the light emission brightness of the fifth chip is lower than that of the sixth chip.

12. The display device of claim 11, wherein an area of the fourth wafer and an area of the fifth wafer are each less than that of the sixth wafer.

13. The display device of claim 10, wherein at least one bent portion is arranged around the flat portion, and wherein the lamp beads are arranged around the light guide plate.

14. The display device of claim 1, wherein the light supplementation structure comprises a lamp bead, the lamp bead comprising a reflector cup holder, a seventh chip, and an eighth chip;
   wherein the reflector cup holder has a first slop and a second slop, the first slop facing a junction of the bent portion and the flat portion, and the second slop facing the light guide plate;
   wherein the seventh chip is disposed on the first slop, and the eighth chip is disposed on the second slop;
   wherein a side of the light guide plate corresponding to the lamp bead is a light incident surface that is inclined, and a slope of the light incident surface is equal to that of the second slop;
   wherein the second slop is disposed to face the light incident surface of the light guide plate.

15. The display device of claim 14, wherein the bent portion is arranged on all sides of the flat portion, and the lamp bead is arranged on all sides of the light guide plate.

16. The display device of claim 1, wherein the optical film comprises a main body part and a curved part disposed on an edge of the main body part;
   wherein the main body part is disposed corresponding to the flat portion of the liquid crystal display panel, and the curved part is disposed corresponding to the bent portion of the liquid crystal display panel.

17. The display device of claim 16, wherein the light supplementation structure comprises a plurality of lamp beads, and wherein the lamp beads that are located on a same side of the light guide plate are connected in series.

18. The display device according to claim 16, wherein the light supplementation structure comprises a plurality of lamp beads, which are disposed around the light guide plate, and wherein all the lamp beads around the light guide plate are connected in series.

19. A display device, comprising a backlight module and a liquid crystal display panel that are correspondingly arranged;
   wherein the liquid crystal display panel comprises a flat portion and at least one bent portion;
   wherein one end of the at least one bent portion is connected to an edge of the flat portion, and the other end of the at least one bent portion is bent downward;
   wherein the backlight module comprises a light guide plate, an optical film, and a lamp bead; wherein the optical film is disposed between the light guide plate and the liquid crystal display panel and covers the light guide plate and the lamp bead;
   wherein the light guide plate is arranged corresponding to the flat portion; and
   wherein the lamp bead is disposed between the light guide plate and the bent portion;
   wherein the lamp bead comprises a reflector cup holder, a first chip, and a second chip; wherein the first chip and the second chip are arranged on the reflector cup holder; wherein the first chip is disposed to face the bent portion, and wherein the second chip is disposed to face the flat portion corresponding to the lamp bead, and is configured to supplement light for a part of the flat portion opposite the lamp bead;
   wherein positions of the reflection cup holder corresponding to the first chip and the second chip are each recessed toward an interior of the reflection cup holder to form a reflective groove, and wherein the first chip and the second chip are respectively arranged in two different reflective grooves; wherein a fluorescent glue is disposed on a groove wall of the reflective groove; wherein the groove wall of the reflective groove is inclined and an area of the notch of the reflective groove is larger than an area of the groove bottom.

20. A backlight module, the backlight module being configured to provide a backlight for a liquid crystal panel;
   wherein the liquid crystal display panel comprises a flat portion and at least one bent portion;
   wherein one end of the at least one bent portion is connected to an edge of the flat portion, and the other end of the at least one bent portion is bent downward;
   wherein the backlight module comprises a light guide plate, an optical film, and a light supplementation structure; wherein the optical film is disposed between the light guide plate and the liquid crystal display panel and covers the light guide plate and the light supplementation structure;
   wherein the light guide plate is arranged corresponding to the flat portion; and wherein the light supplementation structure is disposed between the light guide plate and the bent portion and is configured to supplement light for the bent portion.

\* \* \* \* \*